United States Patent [19]

Sano et al.

[11] 4,447,833
[45] May 8, 1984

[54] METHOD FOR PRODUCING A HALFTONE PLATE

[75] Inventors: Tetsuo Sano; Takashi Sakamoto, both of Kyoto, Japan

[73] Assignee: Dainippon Screen Seizo Kabushiki Kaisha, Japan

[21] Appl. No.: 336,309

[22] Filed: Dec. 31, 1981

[30] Foreign Application Priority Data

Jan. 21, 1981 [JP] Japan ................................ 56-6307

[51] Int. Cl.³ ............................................. H04N 1/22
[52] U.S. Cl. .................................... 358/298; 358/283
[58] Field of Search ........................ 358/283, 280, 298

[56] References Cited

U.S. PATENT DOCUMENTS

4,196,453 4/1980 Warren ............................... 358/283

Primary Examiner—Howard W. Britton
Assistant Examiner—Edward L. Coles
Attorney, Agent, or Firm—Poms, Smith, Lande & Rose

[57] ABSTRACT

A method for producing a halftone plate from an original picture having a continuous tone. A record film is exposed at least one exposure light beam of a smaller size than a halftone dot area by independently controlling it to turn on or off according to a picture signal. The luminous energy of the exposure light beam is controlled depending on a reference value corresponding to the picture signal and a position signal value varied depending on an exposing position in the halftone dot area to be exposed by the exposure light beam. The control of the luminous energy is performed by the sum, the difference, the product or the quotient of the two signal values. A plurality of reference values or position signal values may be used.

6 Claims, 14 Drawing Figures

FIG. 1

| 60 | 52 | 44 | 36 | 40 | 48 | 56 | 62 |
|---|---|---|---|---|---|---|---|
| 59 | 32 | 24 | 16 | 20 | 28 | 34 | 54 |
| 57 | 31 | 12 | 4 | 8 | 14 | 26 | 46 |
| 43 | 23 | 11 | 0 | 2 | 6 | 18 | 38 |
| 39 | 19 | 7 | 3 | 1 | 10 | 22 | 42 |
| 47 | 27 | 15 | 9 | 5 | 13 | 30 | 50 |
| 55 | 35 | 29 | 21 | 17 | 25 | 33 | 58 |
| 63 | 57 | 49 | 41 | 37 | 45 | 53 | 61 |

S, P indicated at right side.

FIG. 2

| <0 | <0 | <0 | <0 | <0 | <0 | <0 | <0 |
|---|---|---|---|---|---|---|---|
| <0 | =0 | 8 | 16 | 12 | 4 | <0 | <0 |
| <0 | 1 | 20 | 28 | 24 | 18 | 6 | <0 |
| <0 | 9 | 21 | 32 | 30 | 26 | 14 | <0 |
| <0 | 13 | 25 | 29 | 31 | 22 | 10 | <0 |
| <0 | 5 | 17 | 23 | 27 | 19 | 2 | <0 |
| <0 | <0 | 3 | 11 | 15 | 7 | <0 | <0 |
| <0 | <0 | <0 | <0 | <0 | <0 | <0 | <0 |

S, P indicated at right side.

FIG. 3

| 0 | 0 | 0 | 0 | 0 | 0 | 0 | 0 |
|---|---|---|---|---|---|---|---|
| 0 | 0 | $\frac{8}{16}$ | 1 | $\frac{12}{16}$ | $\frac{4}{16}$ | 0 | 0 |
| 0 | $\frac{1}{16}$ | 1 | 1 | 1 | 1 | $\frac{6}{16}$ | 0 |
| 0 | $\frac{9}{16}$ | 1 | 1 | 1 | 1 | $\frac{14}{16}$ | 0 |
| 0 | $\frac{13}{16}$ | 1 | 1 | 1 | 1 | $\frac{10}{16}$ | 0 |
| 0 | $\frac{5}{16}$ | 1 | 1 | 1 | 1 | $\frac{2}{16}$ | 0 |
| 0 | 0 | $\frac{3}{16}$ | $\frac{11}{16}$ | $\frac{15}{16}$ | $\frac{7}{16}$ | 0 | 0 |
| 0 | 0 | 0 | 0 | 0 | 0 | 0 | 0 |

S, P indicated at left side.

|   | $n_1$ | $n_2$ | $n_3$ | $n_4$ |
|---|---|---|---|---|
| 0 | 0 | 0 | 0 | 0 |
| 1 | 1 | 1 | 0 | 0 |
|   |   |   |   |   |
| 128 | 128 | 112 | 96 | 80 |
|   |   |   |   |   |
| 255 | 255 | 255 | 255 | 255 |

| 60 | 52 | 44 | 36 | 40 | 48 | 56 | 62 |
| 59 | 32 | 24 | 16 | 20 | 28 | 34 | 54 |
| 51 | 31 | 12 | 4 | Q 8 | 14 | R 26 | 46 |
| 43 | 23 | 11 | 0 | 2 | 6 | 18 | 38 |
| 39 | 19 | 7 | 3 | P 1 | 10 | 22 | 42 |
| 47 | 27 | 15 | 9 | 5 | 13 | 30 | 50 |
| 55 | 35 | 29 | 21 | 17 | 25 | 33 | 58 |
| 63 | 57 | 49 | 41 | 37 | 45 | 53 | 61 |

METHOD FOR PRODUCING A HALFTONE PLATE

BACKGROUND OF THE INVENTION

The present invention relates to a method for producing a halftone plate from an original picture having a continuous tone, and more particularly relates to a method for producing a halftone plate composed of halftone dots which can be effectively processed by the dot etching.

In a conventional picture reproducing machine such as a color scanner, a halftone plate is produced from an original picture having a continuous tone by exposing a lithographic recording film via a halftone contact screen overlapped thereon by using a light beam modulated by a picture signal picked up from the original picture. Alternatively, the original picture and the halftone contact screen are scanned separately in the synchronous relation to obtain output signals and then the output signals are treated electrically to prepare a halftone plate.

However, in such methods wherein the halftone contact screen is used, there are disadvantages such as high cost, unevenness of halftone dots by a poor contact between the halftone contact screen and the film, a large exposure light source, and an inevitable complicated and large machine.

Other methods wherein the halftone dots are produced electrically, have been developed. For example, a halftone plate is produced on a recording film by means of an exposure light beam whose width and central position are controlled depending on the picture signal, or by means of an exposure light beam consisting of a line of light spots, each being adapted to be turned on or off independently according to the picture signal.

In the latter method, as disclosed in Japanese Patent Publication No. 52-33523, the peripheral and the central parts of the halftone dot are exposed by substantially the same luminous energy, and thus the obtained halftone dot includes extremely less fringe part, i.e. a so-called very hard halftone dot is obtained. It is sometimes inconvenient for the original film for plate making.

In this method, the desired halftone plate is not always obtained, and it often happens that a part or the entire of the halftone plate is to be corrected. On such an occasion, the halftone dots are diminished or enlarged by the dot etching, that is, etching the silver deposit composing the halftone dots on the halftone film, partly or throughout its surface.

However, in the hard halftone dot as described above, the central and the peripheral parts are exposed by substantially the same luminous energy, and hence the same amount of silver metal is deposited over the halftone film. Therefore, such a hard halftone dot can not be diminished gradually from the peripheral part to the center, and the silver deposit is reduced to the same amount in the central and the peripheral parts instead, with the result of a useless halftone plate.

In order to remove this disadvantage, another method has been proposed, as disclosed in the U.S. Pat. No. 4,025,189. In this method, an addition or subtraction value of two values of a picture signal picked up from the original picture and a signal generated by a screen pattern generator, is used. That is, the two addition or subtraction values for controlling the luminous energies of the adjacent two of light beams arranged in parallel with one another, are compared in numerical order.

Then, when the two addition or subtraction values for the adjacent two light beams satisfy the same condition such as exposure or non-exposure, at the same time, the luminous energy of the light beam of the latter number is controlled depending on its addition or subtraction value, i.e. the exposure or the non-exposure condition. Meanwhile, assuming that the two addition or subtraction values for the adjacent two light beams are a and b, when the values a and b are different, a calculation $$C = \frac{a + b}{|a - b|}$$

is carried out, and the light beam of the latter number is controlled to the intermediate luminous energy between the exposure and the non-exposure conditions depending on the calculation result C.

However, this method requires not only an addition or subtraction circuit but an absolute-value circuit and a dividing circuit. Hence, this method involves a complicated machine and the division in the digital manner requires rather long time, which is inconvenient for the rapid operation which is getting quicker and quicker in future, required to the color scanner and the like.

SUMMARY OF THE INVENTION

It is an object of the present invention to provide a method for producing a halftone plate from an original picture having a continuous tone, which is composed of halftone dots having a fringe part in the peripheries similar to vignette halftone dots formed by photography, which can be effectively corrected by the dot etching, free from the aforementioned disadvantages, which is capable of performing a quick, simple and stable operation.

According to the present invention there is provided a method for producing a halftone plate from an original picture having a continuous tone by using at least one exposure light beam of a smaller size than a halftone dot area, which is independently controlled to be turned on or off according to a picture signal obtained by scanning the original picture, the improvement which comprises a step of controlling the luminous energy of the exposure light beam depending on a reference value corresponding to the picture signal, and a position signal value which is varied depending on an exposure position in the halftone dot area to be exposed by the exposure light beam.

BRIEF DESCRIPTION OF DRAWINGS

In order that the present invention may be better understood, preferred embodiments thereof will be described with reference to the accompanying drawings, in which.

DESCRIPTION OF THE PREFERRED EMBODIMENTS

Figure 1:
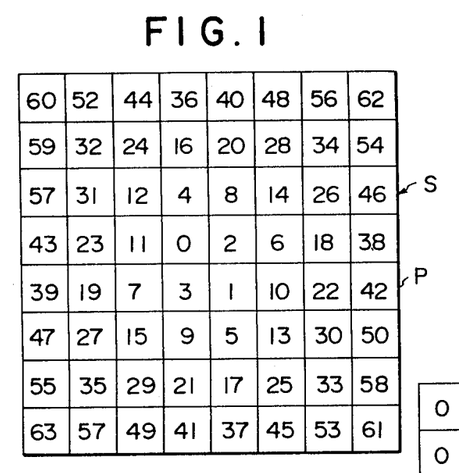
FIG. 1 shows one embodiment of a halftone dot area as a screen pattern, which is divided into a plurality of picture elements, each having a number which increases one by one from the central position to the peripheral position.

Referring now to the drawings there is shown in FIG. 1 a halftone dot area S having a screen angle of 0 degree, as a screen pattern, which is divided into $8 \times 8 = 64$ picture elements p, each having a number which increases one by one from the central position to the peripheral position. The halftone dot area S may be divided into $12 \times 12 = 144$, $14 \times 14 = 196$, $16 \times 16 = 256$, or the like, in order to improve the quality of the halftone dots. The halftone dot area S shown in FIG. 1 may be scanned vertically to be recorded by eight exposure light beams or spots aligned horizontally in a row.

Now, assuming that a digital picture signal n obtained by converting an analog picture signal picked up from an original picture by scanning, in an analog-digital converter, hereinafter referred to as a reference value n, is a fixed value while the halftone dot area S of FIG. 1 is recorded, in order to simplify the explanation, first, a difference $n-m$ between the reference value n and a number m attached to each picture element is calculated, and then the obtained difference $n-m$ is compared with predetermined maximum and minimum values Vmax and Vmin.

When the picture element which satisfies $n-m \geq Vmax$, is exposed, an exposure light beam is modulated to the full luminous energy, when the picture element which satisfies $n-m \leq Vmin$, is exposed, the exposure light beam is modulated to zero luminous energy, and when the picture element which satisfies $Vmin < n-m < Vmax$, is exposed, the exposure light beam is modulated to an intermediate luminous energy between the full and the zero luminous energies, corresponding to the value $n-m$, thereby obtaining the halftone dots similar to the conventional vignette halftone dots which can be effectively corrected by the dot etching.

Figure 2:
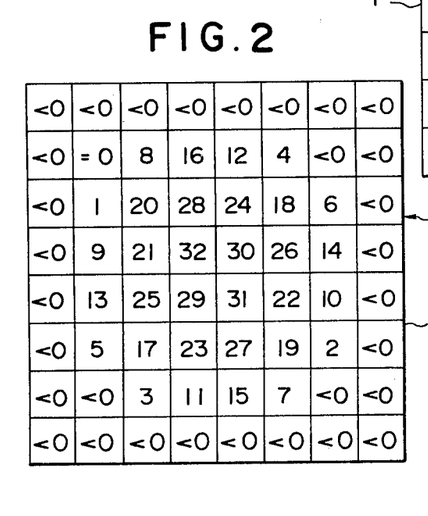
FIG. 2 shows a screen pattern of a halftone dot area, which is obtained by comparing the number of each of the picture elements of FIG. 1 with a reference value.
Figure 3:
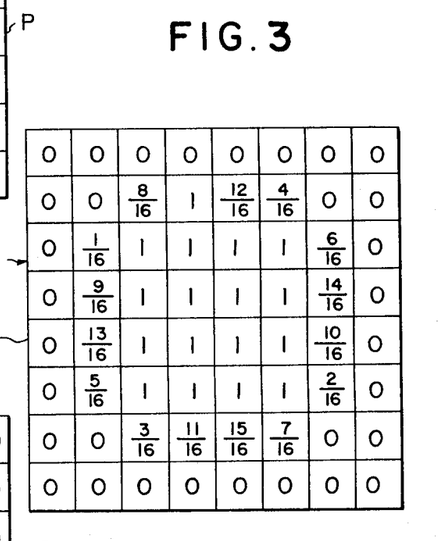
FIG. 3 shows a screen pattern of a halftone dot area, wherein a luminous energy of an exposure light beam, obtained on the basis of the screen pattern of FIG. 2, of the picture elements are shown.

Now, when the reference value n, the maximum value Vmax, and the minimum value Vmin are determined to 32, 16, and 0, respectively, the comparison results of the value $n-m$ with the maximum and the minimum values Vmax and Vmin are obtained, as shown in FIG. 2, and the luminous energies of the picture elements are obtained, as shown in FIG. 3.

Figure 4:
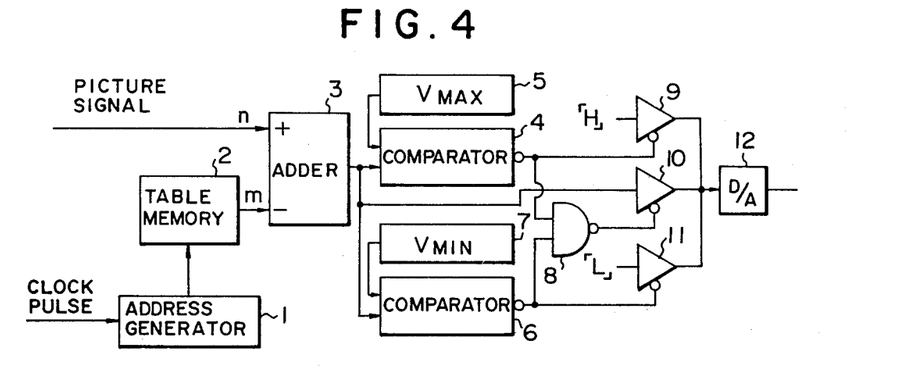
FIG. 4 is a block diagram of a circuit which performs the first method according to the present invention.

In FIG. 4 there is shown one embodiment of a light modulation control circuit which performs the first method according to the present invention, comprising an address generator 1, a table memory 2, an adder 3, comparators 4 and 6, a maximum value setup circuit 5 composed of a digital switch, or the like, a minimum value setup circuit 7, a NAND gate 8, tri-state gates 9, 10 and 11, and a digital-analog converter 12.

The picture signal n obtained by the analog-digital conversion at a proper sampling pitch is input as the reference value to a positive terminal of the adder 3. On the other hand, a clock pulse is fed to the address generator 1 to output an address signal to the table memory 2, and the table memory 2 addressed outputs the number m attached to each picture element to a negative terminal of the adder 3.

The adder 3 calculates the value $n-m$, and sends it to the comparators 4 and 6. The value $n-m$ is compared with the maximum and the minimum values Vmax and Vmin which are fed from the maximum and the minimum value setup circuits 5 and 7, in the comparators 4 and 6. The signal output from the comparator 4 opens the tri-state gate 9 so as to pass a high level signal "H" of the full luminous energy therethrough to the digital-analog converter 12. The signal output from the comparator 6 opens the tri-state gate 11 so as to pass a low level signal "L" of the zero luminous energy therethrough to the digital-analog converter 12. When the value $n-m$ is between the maximum and the minimum values Vmax and Vmin, the signal output from the NAND gate 8 opens the tri-state gate 10 so as to pass the value $n-m$ therethrough to the digital-analog converter 12. Then, the signal passed through the digital-analog converter 12 is fed to a modulator (not shown) for each exposure light beam so that each picture element may be exposed by the desired luminous energy corresponding to the value $n-m$ by the exposed light beam modulated. The light modulation control circuit of FIG. 4 is provided for each exposure light beam.

Figure 5:
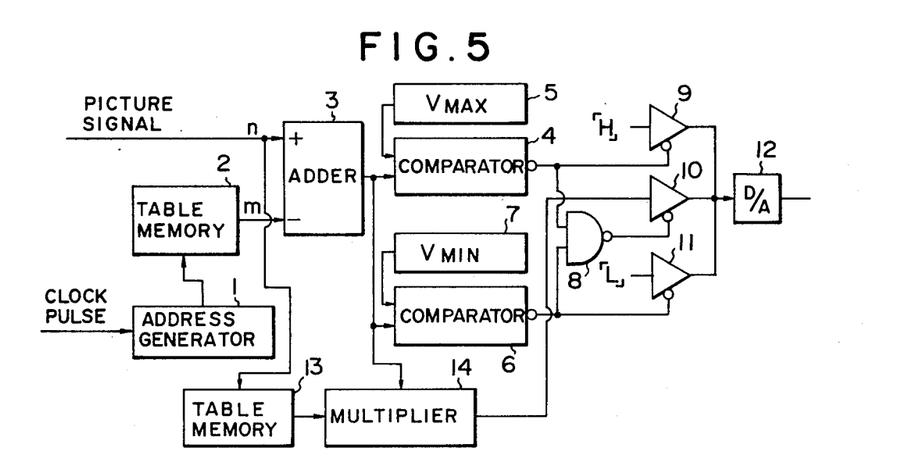
FIG. 5 is a block diagram of another circuit having more enlarged functions than the circuit of FIG. 4.

In FIG. 5 there is shown another embodiment of the light modulation control circuit having more enlarged functions than that of FIG. 4, and having a similar construction to that of FIG. 4, except a function table memory 13 and a multiplier 14 connected thereto.

Figure 6:
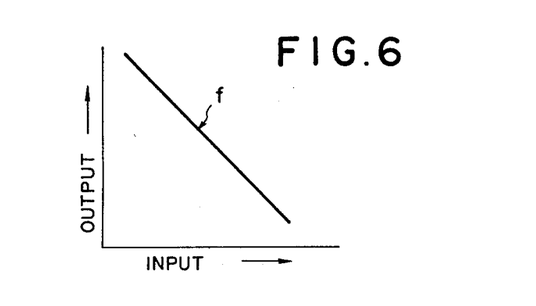
FIG. 6 shows input-output characteristics line of a table memory of FIG. 5.

In this embodiment, the function table memory 13 includes input-output characteristics data, one example of which is shown in FIG. 6. Thus, the function table memory 13 is addressed by the picture signal n to read out the output signal to the multiplier 14. Then, in the multiplier 14, the difference value $n-m$ is multiplied by the output signal of the function table memory 13, and the multiplied difference value is sent to the tri-state gate 10, instead of the difference value $n-m$ of the embodiment of FIG. 4. Accordingly, in this embodiment, the width of the fringe part, i.e. the peripheral part of the halftone dot, which can be processed by the dot etching effectively, can be varied in the highlight, the shadow and the intermediate tone parts of the halftone picture to be recorded.

The width of the fringe part of the halftone dot, which can be processed effectively by the dot etching, can be also varied by the second method according to the present invention. In this embodiment, a plurality of reference values such as $n_1$, $n_2$, $n_3$ and $n_4$ of different relative differences are adapted to be output in parallel depending on the picture signal level such as the highlight, the shadow, or the intermediate tone part, and then the reference values $n_1$, $n_2$, $n_3$ and $n_4$ are compared with the number m of each picture element to obtain the differences $n_1-m$, $n_2-m$, $n_3-m$ and $n_4-m$. Then, the luminous energy of the exposure light beam is controlled depending on the number of the difference values having at least zero.

Figure 7:
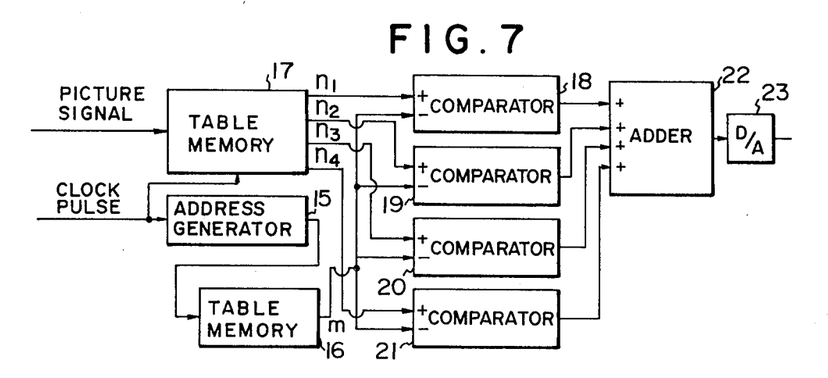
FIG. 7 is a block diagram of further circuit which carries out the second method according to the present invention.

In FIG. 7 there is shown another embodiment of a light modulation control circuit which performs this method. An address generator 15 and a table memory 16 have the same constructions and the functions as those of FIG. 4, and hence, when the clock pulse is fed to the address generator 15, the table memory 16 outputs the number m of each picture element of FIG. 1 to negative terminals of comparators 18, 19, 20 and 21.

Figure 8:
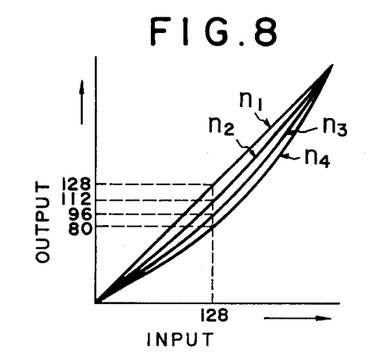
FIG. 8 shows input-output characteristics curves of a table memory of FIG. 7.
Figure 9:
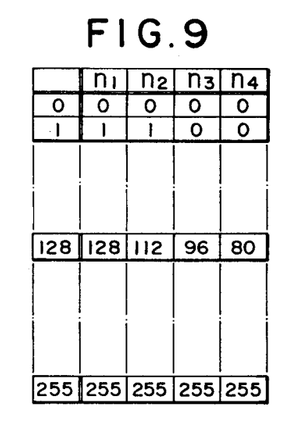
FIG. 9 shows a memory map of a table memory of FIG. 7.

In a table memory 17, input-output characteristics data whose curves are shown in FIG. 8, is stored in parallel as shown in FIG. 9. Hence, when the digital picture signal n is input to the table memory 17, the reference values $n_1$, $n_2$, $n_3$ and $n_4$ are read in parallel out of the addresses corresponding to the picture signal n and are fed to the positive terminals of the comparators 18, 19, 20 and 21 in synchronization with the number m of each picture element. Then, in the comparators 18, 19, 20 and 21, the difference values $n_1-m$, $n_2-m$, $n_3-m$ and $n_4-m$ are calculated. A high level signal is sent to an adder 22 from each comparator 18, 19, 20 or 21 only when the difference value is at least zero.

The high level signals sent from the comparators 18–21 are added in the adder 22, and the adder 22 outputs a control signal which is varied depending on the number of the input high level signals, to an digital-analog converter 23. Then, the control signal passed through the digital-analog converter 23 is fed to the modulator (not shown) for each exposure light beam, thereby controlling the luminous energy of the light beam for exposing each picture element depending on the number of the high level signals.

In this embodiment, since the table memory 17 stores the input-output characteristics data shown in FIG. 8, in other words, the reference values $n_1$, $n_2$, $n_3$ and $n_4$ are varied depending on the input picture signal n, the width of the fringe part of the halftone dot, which can be processed by the dot etching, can be varied in the highlight, the shadow and the intermediate tone parts of the halftone picture to be recorded. Further, since the two reference value characteristics curves $n_2$ and $n_3$ are positioned between the two reference value characteristics curves $n_1$ and $n_4$, and each of the reference values $n_1-n_4$ is compared with the number m of each picture element, the fringe part of the halftone dot to be processed by the dot etching, can be controlled into three density tones.

Figure 10:
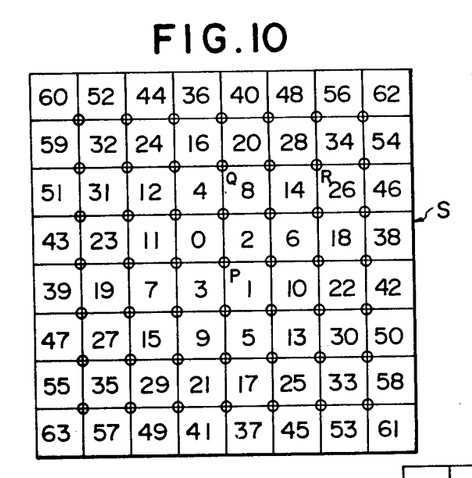
FIG. 10 shows a screen pattern of a halftone dot area, alike FIG. 1, for the explanation of the principle of the third method according to the present invention.

In FIG. 10 there is shown another embodiment of a screen pattern of a halftone dot area S for the explanation of the third method according to the present invention, wherein the picture elements have the same numbers as those of FIG. 1.

In this embodiment, each number m attached to the adjacent picture elements whose corners are joined at a lattice position marked by a small circle, as shown in FIG. 10, is compared with the reference value n, and then the luminous energy of the exposure light beam is controlled depending on the number of the difference values $m-n$ having the larger (or smaller) value than the reference value n. However, in this case, the central position of the exposure light beam is shifted at the half distance of the picture element in the horizontal and the vertical directions, that is, the lattice position or the corner position of the adjacent picture elements, which is marked by the small circle, is exposed one by one by the exposure light beam controlled in the same manner as above, instead of the exposing of the picture element as described above with reference to the first and the second methods.

For example, now, when the reference value n is determined to 15, the luminous energies of the light beam at the points P, Q and R of the lattice position shown in FIG. 10 are determined in the followings.

At the point P, for the right upper picture element, the difference $m-n$ equals $2-15<0$; for the right lower picture element, the difference $m-n$ equals $1-15<0$; for the left upper picture element, the difference $m-n$ equals $0-15<0$; and for the left lower picture element, the difference $m-n$ equals $3-15<0$. For all picture elements, m is lesser than n, and thus the point P is exposed by the full luminous energy of the exposure light beam. At the point Q, for the right and the left, the upper and the lower picture elements, the differences $m-n$ equal $20-15>0$; $8-15<0$; $16-15>0$; and $4-15<0$. The number of the picture elements which satisfy the condition $m<n$, is two, and accordingly the point Q is exposed by 2/4 full luminous energy of the exposure light beam. At the point R, the number of the picture element which satisfies the condition $m<n$, is obtained as one in the same manner as described above, and therefore the point R is exposed by $\frac{1}{4}$ the full luminous energy of the exposure light beam.

Figure 11:
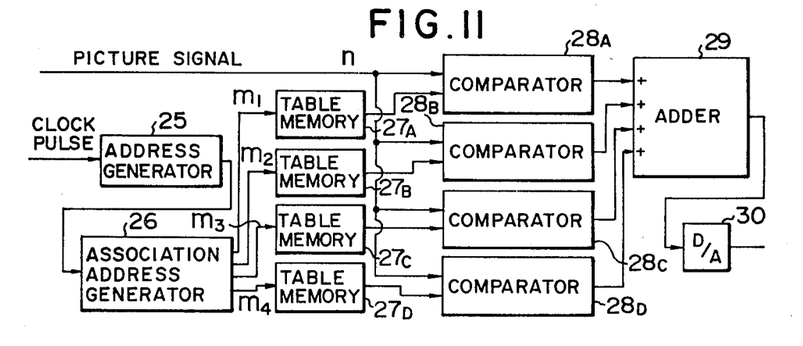
FIG. 11 is a block diagram of still another circuit which performs the third method according to the present invention.

In FIG. 11 there is shown another embodiment of a light modulation control circuit which carries out this method. An address generator 25 receives the clock pulse and outputs an address signal for addressing the lattice position marked by the small circle shown in FIG. 12 in order of scanning to an association address generator 26 hereinafter described in detail, which outputs consecutively a combination of addressing signals $m_1$, $m_2$, $m_3$ and $m_4$, such as ($A_{11}$, $B_{11}$, $C_{11}$, $D_{11}$), ($A_{12}$, $B_{11}$, $C_{12}$, $D_{11}$), ... , and ($A_{nn}$, $B_{nn}$, $C_{nn}$, $D_{nn}$) which correspond to the lattice positions marked by the small circles shown in FIG. 12, to table memories 27A, 27B, 27C and 27D depending on the address signal sent from the address generator 25. The table memories 27A, 27B, 27C and 27D having memory maps shown in FIG. 13 are addressed by the combination of the addressing signals, and output the numbers of the picture elements of FIG. 10 to one terminals of comparators 28A, 28B, 28C and 28D. The digital picture signal n is fed as the reference value to the other terminals of the comparators 28A, 28B, 28C and 28D.

The comparators 28A, 28B, 28C and 28D compare the addressing signals sent from the table memories 27A, 27B, 27C and 27D with the reference value n. When the comparison result of each comparator is at least zero or negative, it outputs a high level signal or a low level signal to an adder 29. Then, the adder 29 adds the high level signals or the low level signals, and outputs a control signal corresponding to the addition result to a digital-analog converter 30. Then, the analog control signal output from the digital-analog converter 30 is fed to a modulator (not shown) for the exposure light beam.

Figure 14:
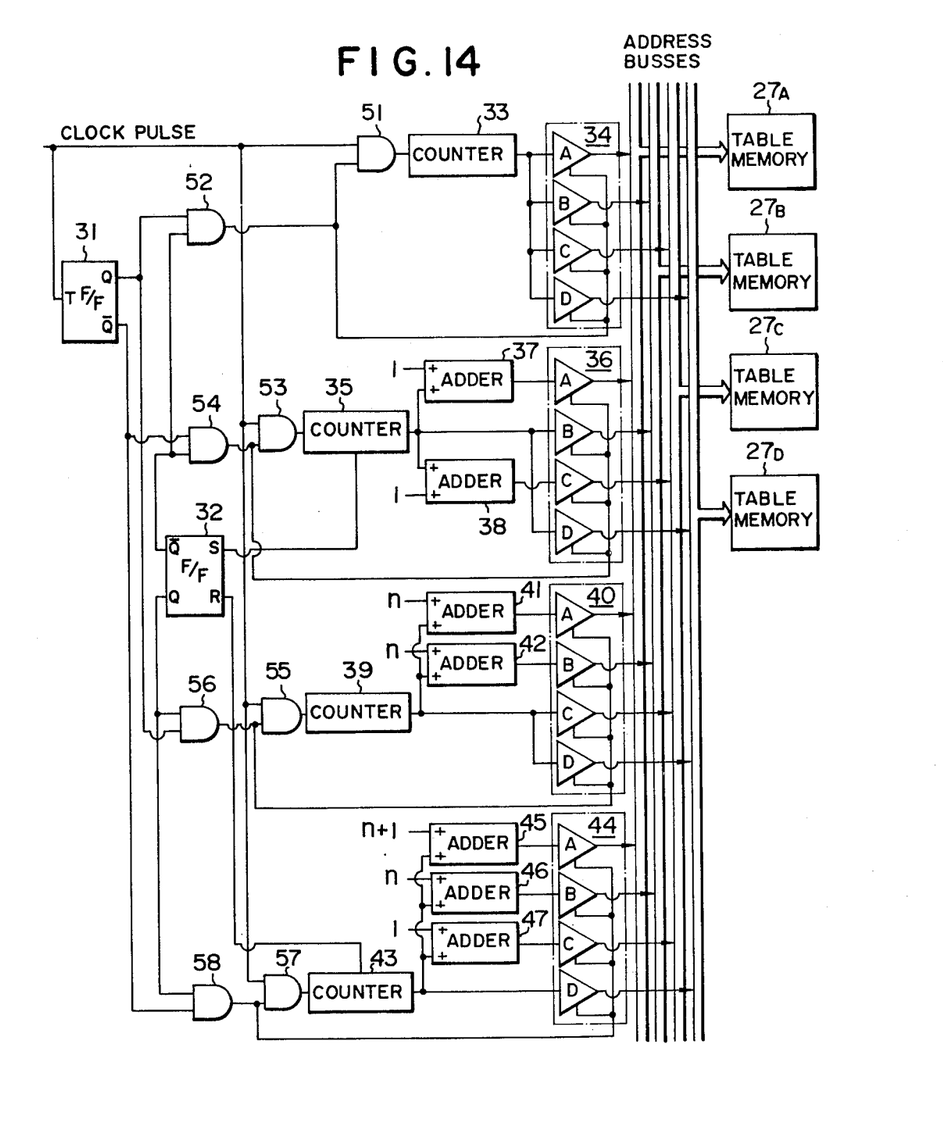
FIG. 14 shows one embodiment of an association address generator of FIG. 11.

In FIG. 14, there is shown one embodiment of the association address generator 26 whose function will be explained with reference to FIG. 12.

Figure 12:
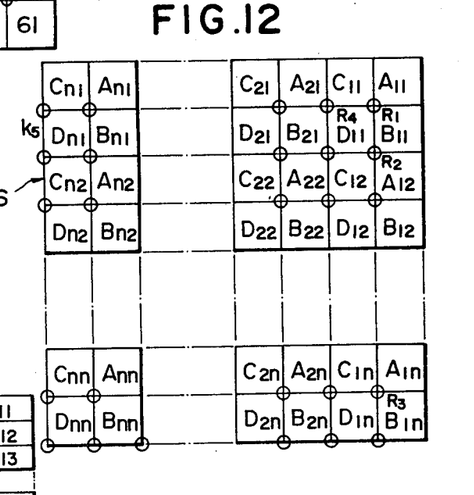
FIG. 12 shows a screen pattern of a halftone dot area, wherein addresses of a table memory are attached to the picture elements of FIG. 10.
Figure 13:
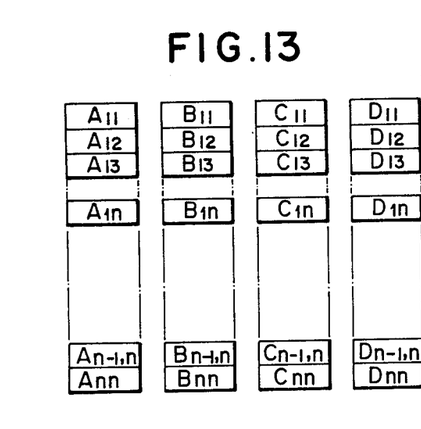
FIG. 13 shows a memory map of a table memory of FIG. 11.

When the address signal corresponding to the lattice position $R_1$ of FIG. 12 is fed as a clock pulse from the address generator 25 to the association address generator 26, as shown in FIG. 11, the clock pulse is sent to a flip-flop circuit 31, hereinafter referred to as F/F circuit, and a F/F circuit 32 of a set-reset type. The outputs $Q=0$ and $\overline{Q}=1$ of the F/F circuit 31 are inverted to $Q=1$ and $\overline{Q}=0$, and the outputs of the F/F circuit 32 are kept to $Q=0$ and $\overline{Q}=1$.

Accordingly, since an AND gate 52 is opened, the clock pulse is sent to a counter 33 through an AND gate 51 and is counted up there. A group of gates 34 are opened by the output signal of the AND gate 52. An output signal of the counter 33 is fed to the table memories 27A, 27B, 27C and 27D through the gates 34 and address busses, and addresses their addresses $A_{11}$, $B_{11}$, $C_{11}$ and $D_{11}$ corresponding to the first address, thereby reading out the desired data, i.e. the numbers attached to the picture elements from the table memories.

Next, the address signal corresponding to the lattice position $R_2$ of FIG. 12 is sent as the clock pulse from the address generator 25 to the association address generator 26, and the clock pulse is input to the F/F circuit 31 and inverts its outputs $Q=0$ and $\overline{Q}=1$ to $Q=1$ and $\overline{Q}0$, while the outputs of the F/F circuit 32 are still maintained to $Q=0$ and $\overline{Q}=1$. Hence, an AND gate 54 is opened, and the clock pulse is sent to a counter 35 via an AND gate 53 and is counted up there. A group of gates 36 are opened by the output signal of the AND gate 54.

An output signal of the counter 35 is fed to the table memories 27B and 27D through the gates 36 and the address busses, and addresses their addresses $B_{11}$ and $D_{11}$. In the same time, the output signal of the counter 35 is fed to adders 37 and 38 and is added there by the address number one. Then, the added output signal is fed to the table memories 27A and 27C through the gates 36 and the address busses, and addresses their addresses $A_{12}$ and $C_{12}$.

Then, when the address signal corresponding to the lattice position $R_3$ of FIG. 12 is sent as the clock pulse from the address generator 25 to the association address generator 26, the clock pulse input is counted up in the counter 35 in the same manner as the lattice position $R_2$ described above. The output signal of the counter 35 is sent to the table memories 27B and 27D, and addresses the addresses $B_{1n}$ and $D_{1n}$ in the same manner as described above. In the same time, the output signal of the counter 35 is also sent to the table memories 27A and 27C via the adders 37 and 38 wherein the address number one is added, in the same manner as above, and addresses the addresses $A_{1n}$ and $C_{1n}$. When the counter 35 counts up n clock pulses, it outputs a set signal to the F/F circuit 32, and the outputs $Q=1$ and $\overline{Q}0$ of the F/F circuit 32 are inverted to $Q=0$ and $\overline{Q}=1$.

Then, the address signal corresponding to the lattice position $R_4$ of FIG. 12 is sent as the clock pulse from the address generator 25 to the association address generator 26, and the clock pulse is fed to the F/F circuit 31 and inverts the outputs $Q=0$ and $\overline{Q}=1$ to $Q=1$ and $\overline{Q}0$, while the outputs of the F/F circuit 32 are kept to $Q=1$ and $\overline{Q}=0$. Hence, an AND gate 56 is opened, and the clock pulse is sent to a counter 39 through an AND gate 55 and is counted up there. A group of gates 40 are opened by the output signal of the AND gate 56.

An output signal of the counter 39 is sent to the table memories 27C and 27D through the gates 40 and the address busses, and addresses the addresses $C_{11}$ and $D_{11}$. In the same time, an output signal of the counter 39 is input to adders 41 and 42 in which the address number n is added, and the added output signal is sent to the table memories 27A and 27B and addresses the addresses $A_{21}$ and $B_{21}$.

Then, the clock pulse is input to the F/F circuit 31 and inverts its outputs to $Q=0$ and $\overline{Q}=1$, while the outputs of the F/F circuit 32 are maintained. On this occasion, an AND gate 58 is opened, and the clock pulse is fed to a counter 43 via an AND gate 57, and is counted up there. A group of gates 44 are opened by the output signal of the AND gate 58.

The output signal of the counter 43 is input to adders 45, 46 and 47 wherein the address number $n+1$ is added. Then, the added output signal is sent to the table memories 27A, 27B and 27C through the gates 44 and the address busses, while the output signal of the counter 43 is fed to the table memory 27D via the gates 44 and the busses, thereby addressing the addresses $A_{22}$, $B_{21}$, $C_{12}$ and $D_{11}$.

Further, when the address signal corresponding to the lattice position $R_5$ of FIG. 12 is fed as the clock pulse from the address generator 25 to the association address generator 26, the addresses $C_{n1}$ and $D_{n1}$ of the table memories 27C and 27D are addressed in the same manner as described above. However, since no addresses $A_{n+1,1}$ and $B_{n+1,1}$ exists in the table memories 27A and 27B, in practice, the upper figure of the addresses is overflowed and the addresses $A_{11}$ and $B_{11}$ of the table memories 27A and 27B are addressed in the same time.

All addresses of the table memories 27A, 27B, 27C and 27D are consecutively addressed in the same manner as described above, until the counter 43 counts up $n^2$ clock pulses. On this occasion the counter 43 outputs a reset signal to the F/F circuit 32, resulting in the reset of the F/F circuit 32.

In the above embodiments, the present invention has been described with respect to a screen pattern having a screen angle of 0 degree for the brevity of the explanation, but the present invention can be readily applied to the other screen angles whose tangents are expressed by integral numbers' ratios.

Although the present invention has been described with reference to the halftone dot area of the $8\times 8=64$ picture elements, however, it is preferably divided into more picture elements in practice.

In the embodiments described above, the control of the luminous energy of each exposure light beam is carried out depending on the difference between the reference value corresponding to the picture signal obtained by scanning the original picture and the signal value corresponding to the exposing position in the halftone dot area, but the control of the luminous energy of the exposure light beam can be performed depending on the sum of the two signal values.

In any case, the reference value corresponding to the picture signal is a density signal, and hence, when this reference value represents a transmittance or reflectance of the light through or from the original picture, the control of the luminous energy of the exposure light beam can be performed depending on the product or the quotient of the reference value and or divided by the signal value corresponding to the exposing position of the halftone dot area.

According to the present invention, the present method can be readily carried out by using a single exposure light beam which is controlled depending on the picture signal in the same manner as described above.

Although the present invention has been described in some detail by way of illustration and example for purposes of clarity of understanding, it will, of course, be understood that various changes and modifications may be made in the form, details, and arrangements of the parts without departing from the scope of the present invention as set forth in the following claims.

What is claimed is:

1. A method for producing a halftone plate from an original picture having a continuous tone by using at least one exposure light beam of a smaller size than a halftone dot area, which is independently controlled to be turned on or off according to a picture signal obtained by scanning the original picture, the improvement which comprises a step of controlling the luminous energy of the exposure light beam depending on a reference value corresponding to the picture signal, and a position signal value which is varied depending on an exposure position in the halftone dot area to be exposed by the exposure light beam, wherein the control of the luminous energy of the exposure light beam is performed depending on the sum of the reference value and the position signal value.

2. A method for producing a halftone plate from an original picture having a continuous tone by using at least one exposure light beam of a smaller size than a halftone dot area, which is independently controlled to be turned on or off according to a picture signal obtained by scanning the original picture, the improvement which comprises a step of controlling the luminous energy of the exposure light beam depending on a reference value corresponding to the picture signal, and a position signal value which is varied depending on an exposure position in the halftone dot area to be exposed by the exposure light beam, wherein the control of luminous energy of the exposure light beam is performed depending on the difference between the reference value and the position signal value.

3. A method for producing a halftone plate from an original picture having a continuous tone by using at least one exposure light beam of a smaller size than a halftone dot area, which is independently controlled to be turned on or off according to a picture signal obtained by scanning the original picture, the improvement which comprises a step of controlling the luminous energy of the exposure light beam depending on a reference value corresponding to the picture signal, and a position signal value which is varied depending on an exposure position in the halftone dot area to be exposed by the exposure light beam, wherein the control of the luminous energy of the exposure light beam is performed depending on the product of the reference value and the position signal value.

4. A method for producing a halftone plate from an original picture having a continuous tone by using at least one exposure light beam of a smaller size than a halftone dot area, which is independently controlled to be turned on or off according to a picture signal obtained by scanning the original picture, the improvement which comprises a step of controlling the luminous energy of the exposure light beam depending on a reference value corresponding to the picture signal, and a position signal value which is varied depending on an exposure position in the halftone dot area to be exposed by the exposure light beam, wherein the control of the luminous energy of the exposure light beam is performed depending on the quotient of the reference value divided by the position signal value.

5. A method as defined in claims 1, 2, 3 or 4, wherein the control of the luminous energy of the exposure light beam is performed by using a plurality of reference values.

6. A method as defined in claims 1, 2, 3 or 4, wherein the control of the luminous energy of the exposure light beam is performed by using a plurality of position signal values.

* * * * *